(12) United States Patent
Kobayashi

(10) Patent No.: US 7,367,678 B2
(45) Date of Patent: May 6, 2008

(54) SINGLE-PLATE COLOR PROJECTOR AND SYNCHRONIZATION ADJUSTING METHOD THEREFOR

(75) Inventor: Michio Kobayashi, Tokyo (JP)

(73) Assignee: NEC Viewtechnology, Ltd., Tokyo (JP)

( * ) Notice: Subject to any disclaimer, the term of this patent is extended or adjusted under 35 U.S.C. 154(b) by 342 days.

(21) Appl. No.: 11/099,610

(22) Filed: Apr. 6, 2005

(65) Prior Publication Data
US 2005/0225731 A1 Oct. 13, 2005

(30) Foreign Application Priority Data
Apr. 7, 2004 (JP) ............................. 2004-112889

(51) Int. Cl.
G03B 21/00 (2006.01)
G03B 21/14 (2006.01)

(52) U.S. Cl. .......................................... 353/31; 353/84

(58) Field of Classification Search .................. 353/30, 353/31, 84
See application file for complete search history.

(56) References Cited

U.S. PATENT DOCUMENTS

| 5,967,636 A * | 10/1999 | Stark et al. ..................... 353/84 |
| 2004/0125242 A1* | 7/2004 | Kim ............................. 348/743 |
| 2005/0179823 A1* | 8/2005 | Kim ............................. 348/743 |
| 2006/0170880 A1* | 8/2006 | Dambach et al. .............. 353/84 |

FOREIGN PATENT DOCUMENTS

| JP | 09-127437 | 5/1997 |
| JP | 11-142804 | 5/1999 |
| JP | 2001-235818 | 8/2001 |
| JP | 2001-337390 | 12/2001 |
| JP | 2002-333671 | 11/2002 |
| JP | 2003-018502 | 1/2003 |
| JP | 2003-102030 | 4/2003 |
| JP | 2004-015522 | 1/2004 |

\* cited by examiner

*Primary Examiner*—Rodney Fuller
(74) *Attorney, Agent, or Firm*—McGinn IP Law Group, PLLC

(57) ABSTRACT

A single-plate color projector includes a color wheel for chromatically separating light emitted from a light source in time series. An image forming device optically modulates each separated color light in sequence. A driving mechanism rotates the color wheel in a circumferential direction. A reflective marker is rotated together with the color wheel. A detector circuit detects movement of the reflective marker to generate a signal. A driving mechanism control circuit drives the driving mechanism in synchronization with the signal generated by the detector circuit. An image forming device control circuit drives the image forming device in synchronization with the signal generated by the detector circuit, and a time adjusting mechanism moves either the reflective marker or the detector circuit or both the reflective marker and the detector circuit to change a relative positional relationship therebetween.

17 Claims, 4 Drawing Sheets

SINGLE-PLATE COLOR PROJECTOR AND SYNCHRONIZATION ADJUSTING METHOD THEREFOR

BACKGROUND OF THE INVENTION

1. Field of the Invention

The present invention relates to a single-plate color projector and a method to adjust synchronization of a color wheel and an image forming device.

2. Description of the Related Art

FIG. 1 illustrates the basic configuration of a conventional single-plate color projector (also referred to as "color projector") using a color wheel. In color projector 10 illustrated in FIG. 1, white light emitted from light source 11 is converged by reflective mirror 12, and irradiated to color wheel 13. Color wheel 13 comprises a disk which is formed with an optical filter (red filter) for transmitting only red light and reflecting or absorbing the remaining color light, an optical filter (green filter) for transmitting only green light and reflecting or absorbing the remaining color light, and an optical filter (blue filter) for transmitting only blue light and reflecting or absorbing the remaining color light. These filters are arranged along the circumferential direction of the disk. Color wheel 13 is driven by driving motor 23, controlled by motor control circuit 22, at high speeds. The filters in respective colors are sequentially inserted into a light path of the light emitted from light source 11 in association with the rotation of color wheel 13, so that white light irradiated to color wheel 13 is separated into red light, green light, and blue light in time series. Each of the separated red, green, and blue light is sent to light valve 14 then to reflective mirror 15 for irradiation to image forming device 16 such as a liquid crystal panel, DMD (registered trademark), etc. On the other hand, image forming device 16 is driven under the control of image forming device control circuit 17. Image forming device control circuit 17 drives image forming device 16 in accordance with a video signal applied thereto. Image forming device control circuit 17 turns ON or OFF each of the cells or miniature mirrors of image forming device 16 in accordance with a video signal applied thereto to reflect the irradiated single-color light pixel by pixel for optical modulation to form image light. The formed image light is directed into projection lens 18 which projects the image light onto a screen etc., not shown, in an enlarged view.

The color projector having the configuration described above must synchronize a color separation performed by color wheel 13 with an optical modulation performed by image forming device 16. In color projector 10 illustrated in FIG. 1, highly reflective marker 19 is attached onto color wheel 13, and reflection-type photo-interrupter 20 is disposed near color wheel 13. Reflection-type photo-interrupter 20 is a sensor having a light emitting element integrated with a light receiving element. Light emitted from the light emitting element impinges on and is reflected by reflective marker 19 each time color wheel 13 rotates once. The reflected light is then received by the light receiving element, and the light receiving element generates a signal. The signal generated by the light receiving element is detected by detector circuit 21, and is applied to motor control circuit 22 and image forming device control circuit 17 as a synchronizing signal. Motor control circuit 22 and image forming device control circuit 17 drive driving motor 23 and image forming device 16 respectively in accordance with the synchronizing signal applied thereto. The foregoing operation accomplishes the synchronization of the color separation performed by color wheel 13 with the optical modulation performed by image forming device 16. Details on a color projector which accomplishes the synchronization in the foregoing manner are described in the specification etc. of Japanese Patent Laid-open Publication No. 2001-337390 (reference document No. 1).

Another technique for accomplishing the synchronization of the color separation performed by the color wheel with the optical modulation performed by the image forming device may involve detecting a light color transmitted by the color wheel with a pair of sensors each detecting different color light, and detecting a time at which light beam from a light source passes through the boundary between the two color filters. For example, a pair of sensors may be composed of a photodiode for detecting blue light and a photodiode for detecting red light, and the beam spot is determined to have passed the boundary between the red filter and blue filter, when the outputs of the respective photodiodes become equal to each other, i.e., when a magenta color is detected. In this way, the boundary between the red filter and blue filter is detected as a reference position for the rotation of the color wheel, and the image forming device is driven based on the result of the detection, thereby accomplishing the synchronization of the color separation performed by the color wheel with the optical modulation performed by the image forming device. Details on a projector which accomplishes the synchronization in this manner are described in the specification etc. of Japanese Patent Laid-open Publication No. 127437/97 (reference document No. 2).

However, there will be errors in the position to which the reflective marker is attached, and the position at which the sensor is disposed. Further, the boundary between the respective color filters includes errors associated with manufacturing. When these errors exist, the technique described in reference document No. 1 fails to fully accomplish the synchronization of the color separation performed by the color wheel with the optical modulation performed by the image forming device, resulting in a failure in to correctly to reproduce the colors.

The technique described in reference document No. 2 cannot accurately detect a magenta color unless the pair of sensors (photodiodes) match each other in characteristics and are equal in detection sensitivity to each other, thus experiencing difficulties in detecting the reference position for the rotation with a high accuracy. Further, since the pair of sensors must detect color light under equal conditions, the pair of sensors are required to be disposed at optically equivalent positions. It is therefore difficult to detect the reference position for the color wheel with high accuracy in a simple configuration to control the rotation time. Consequently, colors are not correctly reproduced as is the technique described in the reference document No. 1.

SUMMARY OF THE INVENTION

It is an object of the present invention to provide a color projector which accurately accomplishes synchronization of color separation performed by a color wheel with an optical modulation performed by an image forming device in a simple configuration, as well as a synchronization adjusting method for the color projector.

A single-plate color projector according to an embodiment of the present invention comprises a color wheel for chromatically separating light emitted from a light source in time series; an image forming device for optically modulating each separated color light in sequence; a driving mechanism for rotating the color wheel in a circumferential direction; a reflective marker rotated together with the color wheel; a detector circuit for detecting movement of the reflective marker to generate a signal; a driving mechanism control circuit for driving the driving mechanism in synchronization with the signal generated by the detector circuit; an image forming device control circuit for driving the image forming device in synchronization with the signal generated by the detector circuit; and a time adjusting mechanism for moving either the reflective marker or the detector circuit or both the reflective marker and the detection circuit to change a relative positional relationship therebetween.

A method of adjusting synchronization of a single-plate color projector according to another embodiment of the present invention relates to a single-plate color projector comprising a light source, a color wheel comprising two or more optical filters for chromatically separating light emitted from the light source in time series, an image forming device for optically modulating each separated color light in sequence, a driving mechanism for rotating the color wheel in a circumferential direction, a reflective marker rotated together with the color wheel, a detector circuit for detecting movement of the reflective marker to generate a signal, a driving mechanism control circuit for driving the driving mechanism in synchronization with the signal generated by the detector circuit, an image forming device control circuit for driving the image forming device in synchronization with the signal generated by the detector circuit. The method comprising the steps of: operating the color projector such that the image forming device is driven only when a particular one of the two or more optical filters is inserted in a light path; detecting a chromaticity value of light projected from the color projector while moving either the reflective marker or the detector circuit or both the reflective marker and the detection circuit; and adjusting a positional relationship between the reflective marker and the detector circuit such that the detected chromaticity value reaches a maximum.

Thus, according to the present invention, an error in synchronization caused by a positional relationship between the reflective marker and the detector circuit can be corrected by physically shifting the reflective marker or detector circuit. Since a chromaticity value of actual projected light is utilized to determine the moving direction and the moving distance, an accurate synchronization adjustment can be accomplished. In addition, since the chromaticity value of projected light can be detected by a conventional detector or measuring device, no special device needs to be provided for adjusting the synchronization. It is therefore possible to accurately adjust the synchronization time in a simple configuration and accordingly reproduce correct colors in accordance with a video signal.

The above and other objects, features and advantages of the present invention will become apparent from the following description with reference to the accompanying drawings which illustrate examples of the present invention.

DETAILED DESCRIPTION OF THE INVENTION

Figure 1:
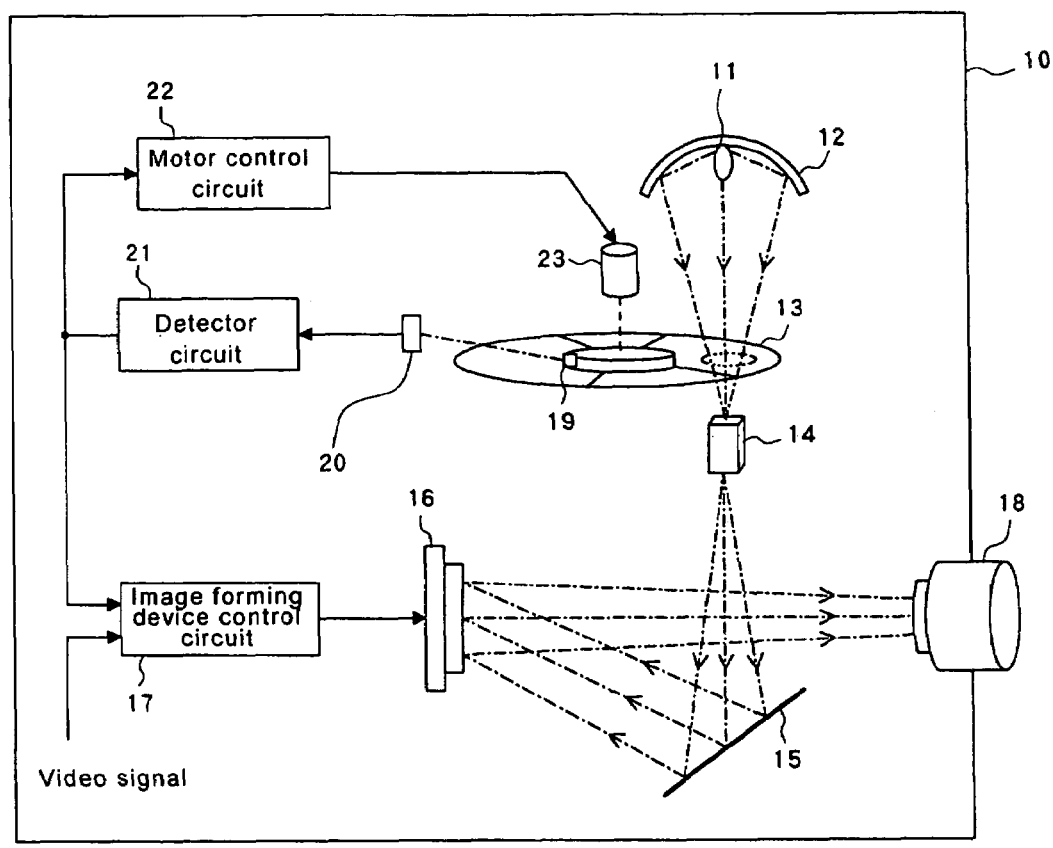
FIG. 1 is a block diagram illustrating an example of a prior art color projector.
Figure 2:
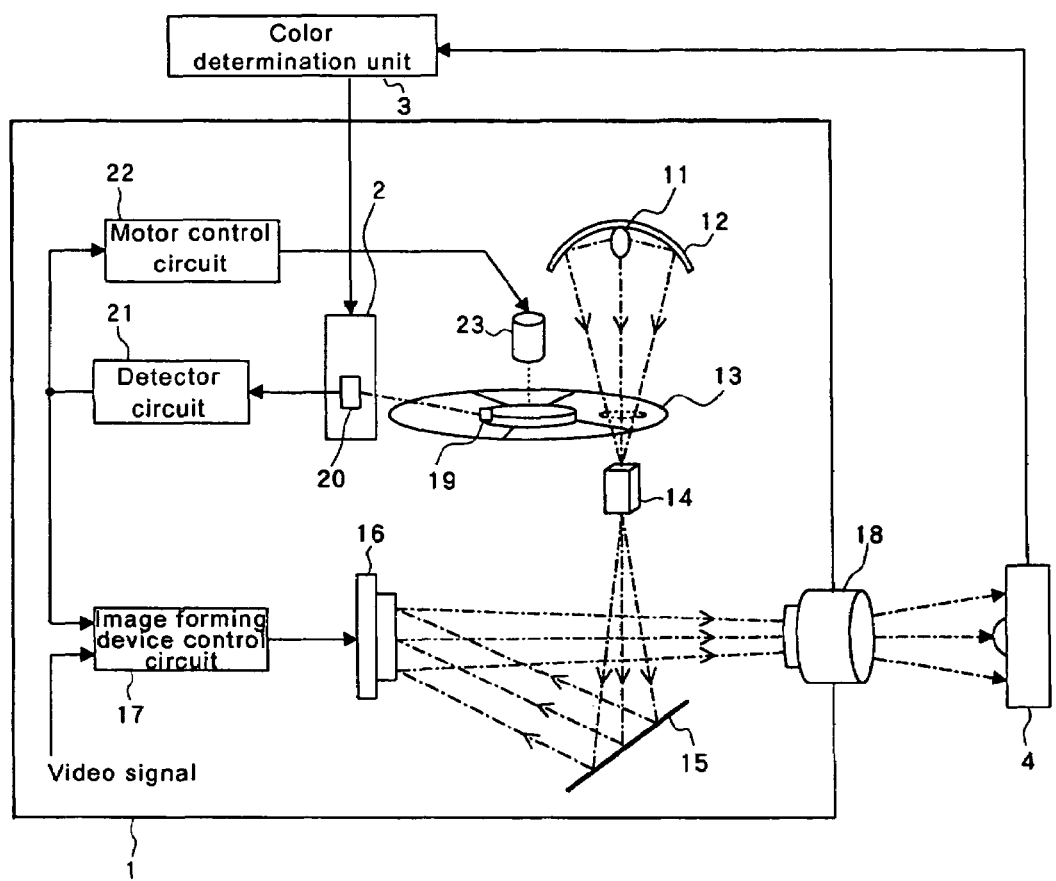
FIG. 2 is a block diagram illustrating one embodiment of a color projector according to the present invention.

Referring to FIG. 2, color projector 1 has time adjuster 2 in addition to the same components as those in color projector 10 illustrated in FIG. 1. Components identical to those illustrated in FIG. 1 are designated the same reference numerals, and repetitive description is omitted. The following description will focus on the features of the color projector according to this embodiment, especially on time adjuster 2.

Time adjuster 2 illustrated in FIG. 2 comprises a movable table, not shown, on which a reflective photo-interrupter 20 is mounted; and a driving mechanism, not shown, for moving the movable table by a distance and in a direction determined by external color determination unit 3. Color determination unit 3 determines a moving direction and a moving distance of the movable table based on the detection result of chromaticity detector 4 which detects colors of light emitted from color projector 1 as chromaticity values. Color determination unit 3 sends the result to the driving mechanism.

Figure 3:
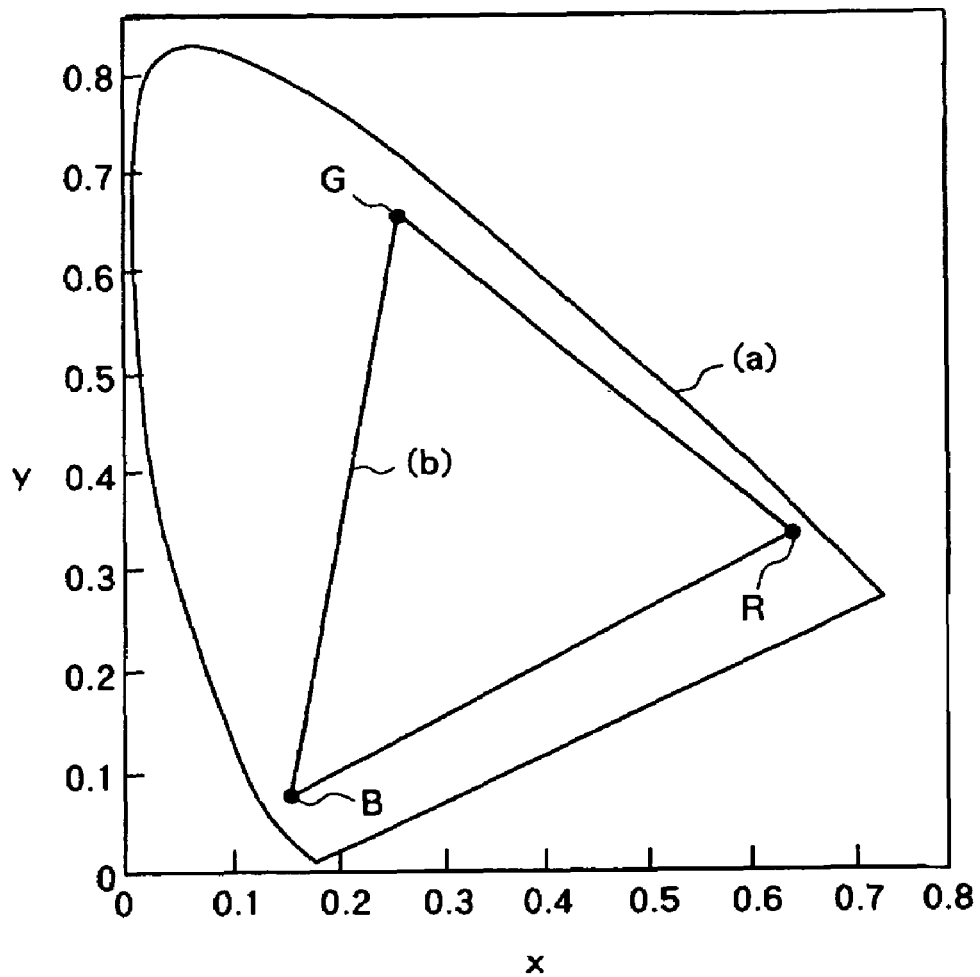
FIG. 3 is a diagram showing a single-color spectrum locus, and a chromaticity diagram representing a range of colors which can be reproduced by the color projector.

FIG. 3 shows colors of light emitted from color projector 1 in an xy chromaticity diagram. Curve (a) shown in FIG. 3 represents a single-color spectrum locus, and all chromaticity values (chromaticity coordinates) of actual objects exist within this area. On the other hand, in single-plate color projector 1 which chromatically separates white light by color wheel 13 composed of a red, a green, and a blue filter, a color image is reproduced by a combination of light in three primary colors, i.e., red, green, blue, so that a color reproducible range exists within triangle (b) shown in FIG. 3. In other words, the chromaticity value of a color reproduced by color projector 1 exists within triangle (b) which has apexes at chromaticity value R of color light which is transmitted by a red filter, chromatcity value G of color light which is transmitted by a green filter, and chromaticity value B of color light which is transmitted by a blue filter. For example, when color projector 1 is operated to emit color light which is transmitted by the red filter only (image forming device 16 is driven to reflect light emitted from light source 11 only when the red filter of color wheel 13 is inserted in the light path of the light emitted from light source 11), the chromaticity value at point R in FIG. 3 will be found by chromaticity detector 4. However, if the time at which a color filter inserted in the light path of the light emitted from light source 11 is switched to the next filter deviates from the time at which image forming device 16 is driven, image forming device 16 continues the reflecting operation even after the next color filter is inserted into the light path. For example, if the time at which the red filter is switched to the blue filter for insertion into the light path is not synchronized with the time at which image forming device 16 is driven, the chromaticity value detected by chromaticity detector 4 will be shifted from point R towards point B along a straight line which connects point R to point B shown in FIG. 3 in accordance with the amount of the deviation between the times. Also, if the time at which the green filter is inserted into the light path instead of the red filter is not synchronized with the time at which the image forming device 16 is driven, the chromaticity value detected by chromaticity detector 4 will be shifted from point R towards point G along a straight line which connects point R to point G shown in FIG. 3 in accordance with the amount of the deviation between the times.

Color projector 1 of the present invention accomplishes the synchronization of time at which a color filter is inserted into the light path instead of a currently inserted color filter with the time at which image forming device 16 is driven by similar principles to color projector 10 illustrated in FIG. 1. Therefore, the error in synchronization as mentioned above is mainly caused by a deviation from an expected positional relationship of the position of reflective marker 19, which serves as a reference position for rotation of color wheel 13, and the position of reflective photo-interrupter 20.

However, color projector 1 of the present invention which comprises time adjuster 2, that can shift reflective photo-interrupter 20, adjusts (calibrates) the synchronization by correcting a relative positional relationship between reflective marker 19 and reflective photo-interrupter 20 in the following procedure.

A computer is provided outside color projector 1 for functioning as color determination unit 3 described above and later again. Color projector 1 is provided with an input port for providing time adjuster 2 with a signal delivered from color determination unit 3. An output port of color determination unit 3 is connected to the input port of color projector 1 through a coaxial cable or the like, so that a signal indicative of a moving direction and a moving distance of the movable table is input to time adjuster 2. Color projector 1 is operated with its input port connected to the output port of color determination unit 3 through the coaxial cable, such that image forming device 16 is driven only when the read filter of color wheel 13 is inserted in the light path of the light emitted from light source 11. As will be apparent from the foregoing description, color wheel 13 is synchronized with image forming device 16 by a synchronizing signal based on the result of the detection made by current reflective photo-interrupter 20. Color projector 1 is provided with a synchronization adjusting mode, and automatically performs the operation as described above in response to a selection of this mode.

Next, the projected light from color projector 1 is incident on chromaticity detector 4. Chromaticity detector 4 detects the chromaticity value of the projected light incident thereon, and sends the detected chromaticity value to color determination unit 3. If reflective marker 19 and reflective photo-interrupter 20 are in a correct relative positional relationship, the chromaticity value detected by chromaticity detector 4 will be found on point R shown in FIG. 3. If there is an error in the relative positional relationship, the chromaticity value detected by chromaticity detector 4 is shifted from point R towards point B along the straight line which connects point R to point B, shown in FIG. 3, or from point R towards point G along the straight line which connects point R to point G. The movable table of time adjuster 2 is moved in a continuous or a step-by-step manner to change the relative positional relationship between reflective marker 19 and reflective photo-interrupter 20. Color determination unit 3 monitors the chromaticity value detected by chromaticity detector 4 simultaneously and directs time adjuster 2 to move reflective photo-interrupter 20 to a position at which the chromaticity value (x-value) reaches a maximum.

With the foregoing procedure, a proper relative positional relationship can be achieved between reflective marker 19 and reflective photo-interrupter 20. As a result, the time at which a color wheel is inserted is correctly synchronized with the time at which image forming device 16 is driven by the synchronizing signal based on the result of the detection by reflective photo-interrupter 20.

Figure 4:
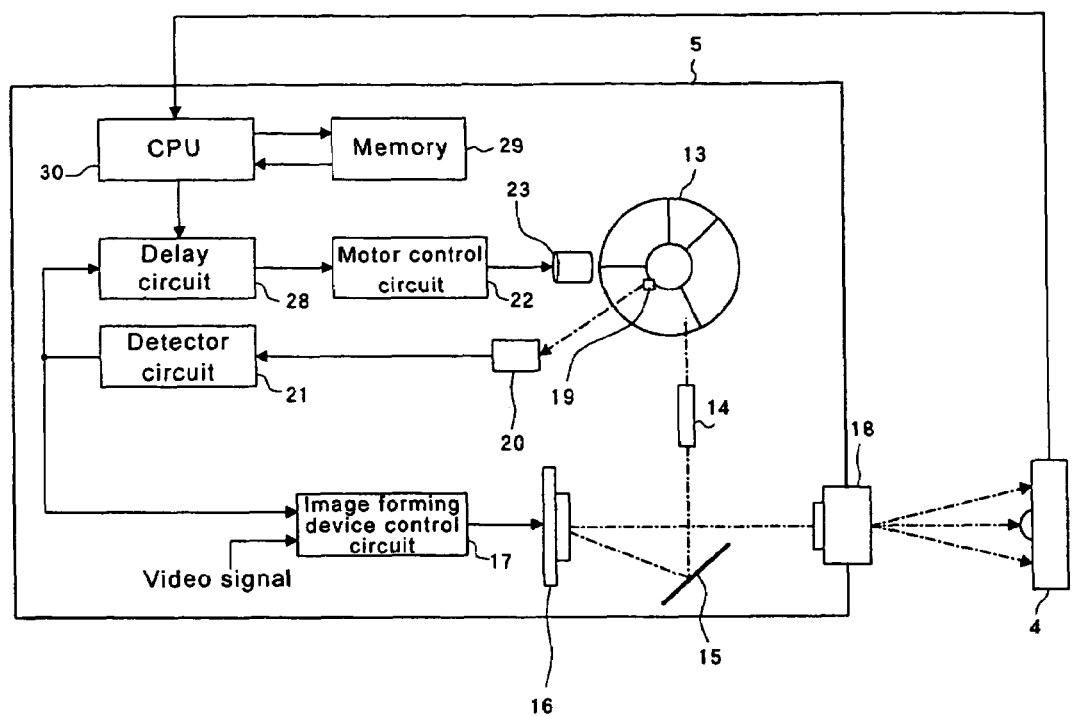
FIG. 4 is a block diagram illustrating another embodiment of a color projector according to the present invention.

Next, another embodiment of the color projector according to the present invention will be described in detail with reference to FIG. 4. FIG. 4 is a block diagram schematically illustrating the configuration of a color projector according to a second embodiment. Color projector 5 is identical in basic configuration to color projector 1 illustrated in FIG. 2. The illustration of light source 11 and reflective mirror 12 is omitted in FIG. 4. A difference is that color projector 1 accomplishes the adjustment of synchronization by physically shifting the position of reflective photo-interrupter 20 through time adjuster 2, whereas color projector 5 of the second embodiment accomplishes a similar adjustment of synchronization by signal processing using delay circuit 28. Components common to color projector 1 illustrated in FIG. 2 are designated the same reference numerals, and are omitted in the following description. The following description will focus on the features of color projector 5 of the second embodiment, especially on delay circuit 28.

Color projector 5 accomplishes the synchronization of the time at which a filter is inserted next with the time of light modulation performed by image forming device 16 by similar principles to color projector 10 illustrated in FIG. 1. Specifically, the time at which a filter is inserted next is synchronized with the time of light modulation performed by image forming device 16 using a synchronizing signal which is delivered from reflective photo-interrupter 20 and detected by detector circuit 21. However, one of two synchronizing signals divided from the signal delivered from detector circuit 21, and which is a synchronizing signal applied to motor circuit 22, is delayed by delay circuit 28 before it is input to motor control circuit 22. On the other hand, image forming device control circuit 17 is provided with a synchronizing signal as delivered from detector circuit 21 without delay.

Color projector 5 correctly synchronizes the time at which a filter is inserted next with the time of light modulation performed by image forming device 16 by adjusting the timing at which color wheel 13 is rotated in the following procedure.

First, as described in connection with the first embodiment, color projector 5 is operated in the synchronization adjusting mode to project only red light. Next, the projected light of color projector 5 is incident on chromaticity detector 4 to detect a chromaticity value of the light. A predetermined output port of chromaticity detector 4 is connected to a predetermined input port of color projector 5 through a coaxial cable or the like. The chromaticity value detected by chromaticity detector 4 is input to CPU(Central Processing Unit) 30. CPU 30 monitors the chromaticity value applied thereto. If reflective marker 19 and reflective photo-interrupter 20 are in a correct relative positional relationship, the chromaticity value input to CPU 30 will be found on point R shown in FIG. 3. However, if there is an error in the relative positional relationship, the applied chromaticity value is shifted from point R towards point B along the straight line which connects point R to point B shown in FIG. 3, or shifted from point R towards point G along the line which connects point R to point G.

CPU 30 monitors the chromaticity value applied thereto, while changing the amount of delay in delay circuit 28 in a continuous or a step-by-step manner, to set the amount of delay which results in a maximum chromaticity value (x-value), and stores the set amount of delay in memory 29. Once stored in memory 29, CPU 30 can read the amount of delay from memory 29 to control the amount of delay in delay circuit 28.

Thus, color projector 5 of the second embodiment correctly synchronizes the time at which a filter is inserted next with the time of light modulation performed by image forming device 16 by adjusting the time at which a filter is inserted next to the time at which image forming device 16 is driven in accordance with a reference synchronizing signal which is not delayed.

Alternatively, one of the two synchronizing signals divided from the signal delivered from detector circuit 21, and which is a synchronizing signal input to image forming device control circuit 17, may be delayed by delay circuit 28, while motor control circuit 22 may be applied with a synchronizing signal which is not delayed. This also correctly synchronizes the time at which a filter is inserted next with the time of light modulation performed by image forming device 16.

While the first and second embodiments have been described in connection with the synchronization adjustment by utilizing red light transmitted by the red filter of color wheel 13, the synchronization adjustment also may be made by utilizing color light which is transmitted by the green filter or blue filter of color wheel 13. The relative positional relationship between reflective marker 19 and reflective photo-interrupter 20 or the amount of delay caused by delay circuit 28 may be adjusted such that a chromaticity value detected by chromaticity detector 4 reaches that of a maximum green color or a maximum blue color. Specifically, the maximum green color is determined when the y-value of the chromaticity value reaches a maximum, and the maximum blue color is determined when the x-value or y-value of the chromaticity value reaches a minimum. Further, the xy-chromaticity coordinate may be rotated in an appropriate manner to detect the maximum or minimum x-value or y-value more accurately.

In certain embodiments, color wheel 13 may comprise a white filter, which is an optical filter which has characteristics of transmitting incident light as it is, in addition to the red filter, green filter, and blue filter, to increase the amount of light emitted from projection lens 18. Since the color reproducible range remains within the area of triangle (b) shown in FIG. 3, the synchronization adjustment may be made by the procedure described above.

Chromaticity detector 4 used in the present invention may be a conventional color meter used for color adjusting for a color projector. It is therefore possible to accurately synchronize the time of color separation performed by the color wheel and the time of light modulation performed by the image forming device without the need of a special device. This is particularly effective when the synchronization is adjusted in a manufacturing factory or a repair site.

Although certain preferred embodiments of the present invention have been shown and described in detail, it should be understood that various changes and modifications may be made without departing from the spirit or scope of the appended claims.

What is claimed is:

1. A single-plate color projector, comprising:
a color wheel for chromatically separating light emitted from a light source in time series;
an image forming device for optically modulating each separated color light in sequence;
a driving mechanism for rotating said color wheel in a circumferential direction;
a reflective marker rotated together with said color wheel;
a detector circuit for detecting a movement of said reflective marker to generate a signal;
a driving mechanism control circuit for driving said driving mechanism in synchronization with the signal generated by said detector circuit;
an image forming device control circuit for driving said image forming device in synchronization with the signal generated by said detector circuit; and
a time adjusting mechanism for moving at least one of the reflective marker and the detector circuit to change a relative positional relationship there between.

2. The single-plate color projector according to claim 1, further comprising:
a chromaticity detector for detecting a chromaticity value of light projected by said color projector,
wherein said time adjusting mechanism moves at least one of the reflective marker and the detector circuit based on a result of a detection made by said chromaticity detector.

3. A single-plate color projector, comprising:
a color wheel for chromatically separating light emitted from a light source in time series;
an image forming device for optically modulating each separated color light in sequence;
a driving mechanism for rotating said color wheel in a circumferential direction;
a reflective marker rotated together with said color wheel;
a detector circuit for detecting a movement of said reflective marker to generate a signal;
a delay circuit for delaying a part of the signal generated by said detector circuit by an amount of delay;
a driving mechanism control circuit for driving said driving mechanism in synchronization with the signal delayed by said delay circuit;
an image forming device control circuit for driving said image forming device in synchronization with the signal generated by said detector circuit and not delayed by said delay circuit; and
a Central Processing Unit (CPU) for setting the amount of delay used in said delay circuit.

4. The single-plate color projector according to claim 3, further comprising:
a chromaticity detector for detecting a chromaticity value of light projected by said color projector,
wherein said CPU sets the amount of delay based on a result of a detection made by said chromaticity detector.

5. A single-plate color projector, comprising:
a color wheel for chromatically separating light emitted from a light source in time series;
an image forming device for optically modulating each separated color light in sequence;
a driving mechanism for rotating said color wheel in a circumferential direction;
a reflective marker rotated together with said color wheel;
a detector circuit for detecting a movement of said reflective marker to generate a signal;
a delay circuit for delaying a part of the signal generated by said detector circuit by an amount of delay;
an image forming device control circuit for driving said image forming device in synchronization with the signal delayed by said delay circuit;
a driving mechanism control circuit for driving said driving mechanism in synchronization with the signal generated by said detector circuit and not delayed by said delay circuit; and
a Central Processing Unit (CPU) for setting the amount of delay used in said delay circuit.

6. The single-plate color projector according to claim 5, further comprising:

a chromaticity detector for detecting a chromaticity value of light projected by said color projector, wherein said CPU sets the amount of delay based on a result of a detection made by said chromaticity detector.

7. A method of adjusting synchronization of a single-plate color projector comprising a light source, a color wheel comprising two or more optical filters for chromatically separating light emitted from the light source in time series, an image forming device for optically modulating each separated color light in sequence, a driving mechanism for rotating said color wheel in a circumferential direction, a reflective marker rotated together with said color wheel, a detector circuit for detecting a movement of said reflective marker to generate a signal, a driving mechanism control circuit for driving said driving mechanism in synchronization with the signal generated by said detector circuit, an image forming device control circuit for driving said image forming device in synchronization with the signal generated by said detector circuit, said method comprising:

operating said color projector such that said image forming device is driven only when a particular one of said two or more optical filters is inserted in a light path;

detecting a chromaticity value of light projected from said color projector while moving at least one of the reflective marker and the detector circuit; and adjusting a positional relationship between said reflective marker and said detector circuit such that the detected chromaticity value reaches a maximum.

8. A method of adjusting synchronization of a single-plate color projector comprising a light source, a color wheel comprising two or more optical filters for chromatically separating light emitted from the light source in time series, an image forming device for optically modulating each separated color light in sequence, a driving mechanism for rotating said color wheel in a circumferential direction, a reflective marker rotated together with said color wheel, a detector circuit for detecting a movement of said reflective marker to generate a signal said method comprising:

operating said color projector such that said image forming device is driven only when a particular one of said two or more optical filters is inserted in a light path, and such that while delaying a part of the signal generated by the detector circuit by an amount of delay, said image forming device is driven in synchronization with the delayed signal, and said driving mechanism is driven in synchronization with the signal which is not delayed;

detecting a chromaticity value of light projected from said color projector while changing the amount of delay; and setting the amount of delay to maximize the detected chromaticity value.

9. A method of adjusting synchronization of a single-plate color projector comprising a light source, a color wheel comprising two or more optical filters for chromatically separating light emitted from the light source in time series, an image forming device for optically modulating each separated color light in sequence, a driving mechanism for rotating said color wheel in a circumferential direction, a reflective marker rotated together with said color wheel, a detector circuit for detecting a movement of said reflective marker to generate a signal, said method comprising:

operating said color projector such that said image forming device is driven only when a particular one of said two or more optical filters is inserted in a light path, and such that while delaying a part of the signal generated by the detector circuit by an amount of delay, said driving mechanism is driven in synchronization with the delayed signal, and said image forming device is driven in synchronization wit the signal which is not delayed;

detecting a chromaticity value of light projected from said color projector while changing the amount of delay; and setting the amount of delay to maximize the detected chromaticity value.

10. A single-plate color projector, comprising:

a light source;

an image forming device receiving a video signal to control a plurality of miniature mirrors to reflect light from said light source;

a color wheel comprising a plurality of optical filters of different colors and located such that each said optical filter can be interposed between said light source and said miniature mirrors;

a motor driving said color wheel in a rotating motion, thereby providing a time series of said different colors onto said plurality of miniature mirrors;

a marker rotated together with said color wheel for synchronizing said rotating motion;

a photo-interrupter comprising a light emitting element directed to a position of said marker and a light sensor detecting a light reflected from said marker;

a detector to detect a reference position in said rotating motion and to provide a marker detection signal to said image forming device, permitting said image forming device to synchronize said time series of said different colors with said video signal; and a synchronizing adjuster to allow the synchronizing between said time series of said different colors and said video signal to be adjusted.

11. The single-plate color projector of claim 10, wherein said synchronizing adjuster comprises:

a chromaticity detector that detects a chromaticity value of a light projected from said single-plate color projector and provides a chromaticity signal; and a time adjustment mechanism that receives said chromaticity signal and provides an adjustment to said synchronizing.

12. The single-plate color projector of claim 11, wherein said time adjustment mechanism comprises:

a color determination unit receiving said chromaticity signal; and a drive mechanism for a movable table upon which is mounted said photo-interrupter, said drive mechanism adjusting a position of said movable table in accordance with a signal from said color determination unit.

13. The single-plate color projector of claim 11, wherein said time adjustment mechanism comprises:

a central processing unit (CPU) receiving said chromaticity signal; and a time delay circuit controlled by said CPU and controlling a motor control circuit that controls said motor driving said color wheel.

14. A method of adjusting a synchronization of a single-plate color projector, said method comprising:

measuring a chromaticity value of a light projected from said single-plate color projector;

using said chromaticity value to provide an adjustment of a color synchronism mechanism that synchronizes colors of said signal-plate color projector;

detecting the chromaticity value of a preselected one of a plurality of color filters arranged in a rotating color wheel; and adjusting a positional relationship between a reflective marker mounted on said rotating color wheel and a detector circuit such that a detected chromaticity value reaches at least one of a maximum value and a minimum value.

15. The method of claim 14, wherein said positional relationship is adjusted by controlling a position of a table upon which is mounted a detector of said detector circuit.

16. A method of adjusting a synchronization of a single-plate color projector, said method comprising:

measuring a chromaticity value of a light projected from said single-plate color projector;

using said chromaticity value to provide an adjustment of a color synchronism mechanism that synchronizes colors of said signal-plate color projector; and adjusting a setting in a time delay circuit such that a detected chromaticity value reaches at least one of a maximum value and a minimum value.

17. The method of claim 16, wherein said time delay circuit controls a motor that rotates said color wheel.

* * * * *